US011855700B2

(12) United States Patent
Oron et al.

(10) Patent No.: US 11,855,700 B2
(45) Date of Patent: Dec. 26, 2023

(54) HIGH BANDWIDTH OPTICAL MODULATOR

(71) Applicant: Mellanox Technologies, Ltd., Yokneam (IL)

(72) Inventors: Moshe B. Oron, Yokneam (IL); Elad Mentovich, Yokneam (IL); Tali Septon, Yokneam (IL)

(73) Assignee: Mellanox Technologies, Ltd., Yokneam (IL)

( * ) Notice: Subject to any disclaimer, the term of this patent is extended or adjusted under 35 U.S.C. 154(b) by 11 days.

(21) Appl. No.: 17/644,625

(22) Filed: Dec. 16, 2021

(65) Prior Publication Data

US 2023/0198625 A1 Jun. 22, 2023

(51) Int. Cl.
*H04B 10/548* (2013.01)
*G02F 1/21* (2006.01)
*G02F 1/225* (2006.01)

(52) U.S. Cl.
CPC ........... *H04B 10/548* (2013.01); *G02F 1/212* (2021.01); *G02F 1/2255* (2013.01)

(58) Field of Classification Search
CPC ...... H04B 10/548; G02F 1/212; G02F 1/2255
USPC ........................................................ 398/187
See application file for complete search history.

(56) References Cited

U.S. PATENT DOCUMENTS 6,345,131 B1  2/2002  Jang
7,409,123 B1  8/2008  Feng
7,542,641 B1  6/2009  Asghari
7,658,552 B2  2/2010  Asghari
7,917,035 B2  3/2011  Asghari
(Continued)

FOREIGN PATENT DOCUMENTS

WO    2022200292 A1    9/2022

OTHER PUBLICATIONS

Nan Qi et al; Co-Design and Demonstration of a 25Gbps Silicon-Photonic Mach Zehnder Modulator with a CMOS Based High Swing Driver ; IEEE; Nov. 2016 ; pp. 1-11. (Year: 2016).*

(Continued)

*Primary Examiner* — Amritbir K Sandhu
(74) *Attorney, Agent, or Firm* — Moore & Van Allen PLLC; Anup Shrinivasan Iyer (57) ABSTRACT

High bandwidth (e.g., >100 GHz) modulators and methods of fabricating such are provided. An optical modulator comprises transmission lines configured to provide a respective radio frequency signal to a respective plurality of segmented capacitive loading electrodes; pluralities of segmented capacitive loading electrodes in electrical communication with a respective one of the transmission lines and in electrical communication with an interface layer of a semiconductor waveguide structure; and the semiconductor waveguide structure. The semiconductor waveguide structure is configured to modulate an optical signal propagating therethrough based at least in part on the respective radio frequency signal. The semiconductor waveguide structure comprises the interface layer, which (a) comprises a semiconductor material and (b) is configured such that an interface resistance of the modulator is ≤4 Ohms. The interface resistance is a serial resistance between the interface layer and respective electrodes of the pluralities of segmented capacitive loading electrodes.

20 Claims, 5 Drawing Sheets

(56) References Cited

U.S. PATENT DOCUMENTS

| | | |
|---|---|---|
| 8,090,231 B1 | 1/2012 | Asghari |
| 8,160,404 B2 | 4/2012 | Pan |
| 8,242,432 B2 | 8/2012 | Feng |
| 8,346,028 B2 | 1/2013 | Feng |
| 8,411,260 B1 | 4/2013 | Feng |
| 8,463,088 B1 | 6/2013 | Asghari |
| 8,476,576 B2 | 7/2013 | Dong |
| 8,526,769 B1 | 9/2013 | Feng |
| 8,638,485 B2 | 1/2014 | Feng |
| 8,724,100 B1 | 5/2014 | Asghari |
| 8,728,837 B2 | 5/2014 | Fong |
| 8,737,772 B2 | 5/2014 | Dong |
| 8,817,354 B2 | 8/2014 | Feng |
| 8,897,606 B2 | 11/2014 | Asghari |
| 8,965,208 B2 | 2/2015 | Asghari |
| 8,989,522 B2 | 3/2015 | Qian |
| 9,025,241 B2 | 5/2015 | Asghari |
| 9,142,698 B1 | 9/2015 | Cunningham |
| 9,217,831 B1 | 12/2015 | Asghari |
| 9,217,836 B2 | 12/2015 | Asghari |
| 9,244,327 B2 * | 1/2016 | Prosyk ............... G02F 1/225 |
| 9,274,353 B1 | 3/2016 | Dong |
| 9,279,936 B2 | 3/2016 | Qian |
| 9,312,960 B1 | 4/2016 | Feng |
| 9,379,515 B1 | 6/2016 | Asghari |
| 9,588,294 B2 | 3/2017 | Fong |
| 9,702,278 B2 | 7/2017 | Gruener |
| 9,798,166 B1 | 10/2017 | Sharma |
| 9,966,733 B2 | 5/2018 | Feng |
| 9,991,965 B2 | 6/2018 | Christensen |
| 10,031,355 B2 | 7/2018 | Feng |
| 10,078,232 B1 | 9/2018 | Vermeulen |
| 10,288,805 B2 | 5/2019 | Luff |
| 10,330,864 B2 | 6/2019 | Asghari |
| 10,394,060 B2 | 8/2019 | Mentovich |
| 10,649,244 B1 | 5/2020 | Mentovich |
| 10,895,797 B2 | 1/2021 | Cavaliere |
| 11,397,363 B2 | 7/2022 | Kawakami |
| 2010/0330727 A1 | 12/2010 | Hill |
| 2012/0251029 A1* | 10/2012 | Kobrinsky ............ G02F 1/035 385/2 |
| 2013/0182305 A1 | 7/2013 | Feng |
| 2015/0010263 A1 | 1/2015 | Fong |
| 2015/0055911 A1 | 2/2015 | Bowers |
| 2017/0269391 A1 | 9/2017 | Feng |
| 2017/0351124 A1 | 12/2017 | Roth |
| 2018/0314128 A1* | 11/2018 | Sun ................. G02F 1/225 |
| 2019/0179177 A1 | 6/2019 | Rickman |
| 2019/0293971 A1 | 9/2019 | Yu |
| 2020/0012043 A1 | 1/2020 | Abediasl |
| 2020/0124878 A1 | 4/2020 | Yu |
| 2021/0191164 A1 | 6/2021 | Mentovich |
| 2021/0336418 A1 | 10/2021 | Lakovlev |
| 2022/0236619 A1 | 7/2022 | Hoessbacher |
| 2022/0337321 A1 | 10/2022 | Argyris |
| 2023/0018578 A1 | 1/2023 | Bakopoulos |

OTHER PUBLICATIONS

Nan Qi et al; Co-Design and Demonstration of a 25Gbps Silicon-Photonic Mach Zehnder Modulator with a CMOS Based High Swing Driver; Nov. 2016: IEEE; pp. 1-11. (Year: 2016).*

Klein, H.N. et al. "1.55um Mach-Zehnder Modulators On InP For Optical 40/80 Gbit/s Transmission Networks," In *2006 International Conference on Indium Phosphide and Related Materials Conference Proceedings*, May 8, 2006, pp. 171-173, IEEE.

Lange, Sophie et al. "100 GBd Intensity Modulation and Direct Detection With An InP-Based Monolithic DFB Laser Mach-Zehnder Modulator," *Journal of Lightwave Technology*, vol. 36, No. 1, Jan. 1, 2018, pp. 97-102.

Li, G.L. et al. "Analysis Of Segmented Traveling-Wave Optical Modulators," *Journal of Lightwave Technology*, vol. 22, No. 7, Jul. 2004, pp. 1789-1796, DOI: 10.1109/JLT.2004.831179.

Qian, Guang et al. "CL-TWE Mach-Zehnder Electro-Optic Modulator Based On InP-MQW Optical Waveguides," *Chinese Optics Letters*, vol. 17, No. 6, Jun. 2019, pp. 061301-1-061301-5, DOI: 10.3788/COL201917.061301.

Velthaus, K.-O. et al. "High Performance InP-Based Mach-Zehnder Modulators For 10 to 100 GB/s Optical Fiber Transmission Systems," $23^{rd}$ *International Conference On Indium Phosphide and Related Materials—IPRM 2011*, May 22-26, 2011, (4 pages), Berlin, Germany.

Yamazaki, Hiroshi et al. "IMDD Transmission At Net Data Rate of 333 GB/s Using Over-100-GHz-Bandwidth Analog Multiplexer and Mach-Zehnder Modulator," *Journal of Lightwave Technology*, vol. 37, No. 8, Apr. 15, 2019, pp. 1772-1778, DOI: 10.1109/JLT.2019.2898675.

Akiyama, Suguru et al. "InP-Based Mach-Zehnder Modulator With Capacitively Loaded Travelling-Wave Electrodes," *Journal of Lightwave Technology*, vol. 26, No. 5, Mar. 1, 2008, pp. 608-615, DOI: 10.1109/JLT.2007.915278.

Lange, Sophie et al. "Low Switching Voltage Mach-Zehnder Modulator Monolithically Integrated With DFB Laser For Data Transmission Up To 107.4 GB/s," *Journal of Lightwave Technology*, vol. 34, No. 2, Jan. 15, 2016, pp. 401-406, DOI: 10.1109/JLT.2015.2496426.

Wang, Gary et al. "Low Vπ, High Bandwidth, Small Form Factor InP Modulator," In 2014 *IEEE Avionics, Fiber-Optics and Photonics Technology Conference (AVFOP)*, Nov. 11, 2014, pp. 41-42, IEEE.

Cui, Yansong et al. "Modeling and Design of GaAs Traveling-Wave electrooptic Modulators Based On Capacitively Loaded Coplanar Strips," *Journal of Lightwave Technology*, vol. 24, No. 1, Jan. 2006, pp. 544-554, DOI: 10.1109/JLT.2005.859851.

Chaciński, Marek et al. "Monolithically Integrated 100 GHz DFB-TWEAM," *Journal of Lightwave Technology*, vol. 27, No. 16, Aug. 15, 2009, pp. 3410-3415, DOI: 10.1109/JLT.2009.2015773.

Stepanenko, Mikhail et al. "Multi-Parameter Optimization Of An InP Electro-Optic Modulator," *Symmetry*, vol. 12, Nov. 21, 2020, pp. 1-18, DOI: 10.3390/sym12111920.

Li, G.L. et al. "Numerical Modeling Of Segmented Traveling-Wave Electroabsorption Modulators," In 2004 *IEEEMTT-S International Microwave Symposium Digest (IEEE Cat. No. 04CH37535)*, Jun. 6, 2004, vol. 2, pp. 773-776, IEEE.

Stepanenko, M. et al. "Optimization of RF Electrodes For Electro-Optic Modulator Based On Quantum-Confined Stark Effect," In *Journal of Physics: Conference Series 2019*, vol. 1145, No. 1:012028, pp. 1-6, IOP Publishing.

Ogiso, Yoshihiro et al. "Over 67 GHz Bandwidth and 1.5 V Vπ InP-Based Optical IQ Modulator With n-i-p-n Heterostructure," *Journal of Lightwave Technology*, vol. 35, No. 8, Apr. 15, 2017, pp. 1450-1455, DOI: 10.1109/JLT.2016.2639542.

Ackermann, M. et al., "Sub-wavelength tunneling barrier in rib waveguide microring modulators with vanishing pending losses," Opt. Lett. 47, 2626-2629 (2022).

Akiyama, S. et al. "Cascaded-ring-resonator-loaded Mach-Zehnder modulator for enhanced modulation efficiency in wide optical bandwith," Opt. Expr. 20, 16321-16338 (2012).

Bin Wang et al. (2022), "Principles of Selective Area Epitaxy and Applications in III-V Semiconductor Lasers Using MOCVD: A Review," Crystals 2022, 12(7), 1011.

Cui, Yansong et al. "Modeling and Design of GaAs Traveling-Wave electrooptic Modulators Based On Capacitively Loaded Coplanar Strips," Journal of Lightwave Technology, vol. 24, No. 1, Jan. 2006, pp. 544-554, DOI: 10.1109/ULT.2005.859851.

D. A. B. Miller et al. (1984), "Band-Edge Electroabsorption in Quantum Well Structures: The Quantum-Confined Stark Effect," Phys. Rev. Lett. 53, 2173.

Han, C. et al., "Recent progress in silicon-based slow-light electro-optic modulators," Micromachines 13, 400 (2022).

Han, C. et al., "Ultra-compact silicon modulator with 110 GHz bandwith," in Proc. Opt. Fib. Comm. Conf. (OFC), (Optica Publishing Group, Washington, D.C. 2022), p. Th4C.5.

Horikawa, T. et al., "A 300-nm silicon photonics platform for large-scale device integration," J. Sel. Top. Quant. Electron, 24, 8200415 (2018).

(56) References Cited

OTHER PUBLICATIONS

Hou et al. (2010), "Monolithic 40 GHz passively Mode-locked AlGaInAs/InP 1.55 mm MQW Laser with Surface-etched Bragg Gratings," European Conference on Integrated Optics (ECIO 10).
J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.
Jafari, O. et al., "Mach-Zehnder silicon photonic modulator assisted by phase-shifted bragg gratings," Photon. Technol. Lett. 32, 445-448 (2020).
K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.
Margalit, N. et al., "Perspectives on the future of silicon photonics and electronics, " Appl. Phys. Lett. 118, 220501 (2021).
Nakai, Y. et al. (2019), "Uncooled Operation of 53-GBd PAM4 (106-GB/s) EA/DFB Lasers With Extremely Low Drive Voltage With 0.9 VPP," Journal of Lightwave Technology, vol. 37, Issue 7, pp. 1658-1662.
Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.
Sharif Azadeh, S. et al., "Low Vp silicon photonics modulators with highly linear epitaxially grown phase shifters," Opt. Expr. 23, 23526-23550 (2015).
Tamura, M. et al. (2003), "High-speed electroabsorption modulators using ruthenium-doped SI-InP: impact of interdiffusion-free burying technology on E/O modulation characteristics," International Conference on Indium Phosphide and Related Materials, 2003. pp. 491-494.
Terada, Y. et al., "Full C-band Si photonic crystal waveguide modulator," Opt. Lett. 42, 5110-5112 (2017).
U.S. Appl. No. 17/694,159, filed Mar. 14, 2022, entitled "Serial Data Conversion Redundacy Using Optical Modulators".
U.S. Appl. No. 17/810,068, filed Jun. 30, 2022, entitled "High Bandwidth Travelling Wave Electro Absorption Modulator (EAM) Chip".
U.S. Appl. No. 17/993,296, filed Nov. 23, 2022, entitled "Traveling Wave Cascaded Micro Ring Modulators".
U.S. Appl. No. 18/110,206, filed Feb. 15, 2023, entitled "System For In-Band Spectral Cross-Talk Monitoring".
U.S. Appl. No. 18/120,719, filed Mar. 13, 2023, entitled "Differential Traveling Wave Electro-Absorption Modulator for High Bandwidth Operation".
U.S. Appl. No. 18/120,802, filed Mar. 13, 2023, entitled "Low Voltage Traveling Wave Electro-Absorption Modulator for High Bandwidth Operation".
U.S. Appl. No. 63/266,527, filed Jan. 7, 2022, entitled "High Bandwidth Travelling Wave Electro Absorption Modulator (EAM) Chip".
Witzens, J., "High-Speed silicon photonics modulators," Proc. IEEE 106, 2158-2182 (2017).

\* cited by examiner

HIGH BANDWIDTH OPTICAL MODULATOR

BACKGROUND

As data communication demands increase in both volume and speed, fiber optics have become an increasingly popular communication approach. One emerging element of this approach for generating the data stream communicated through fiber optics cables comprises electro-optic modulators, such as Mach-Zender modulators (MZMs) and electro-absorption modulators (EAMs), that modulate an optical beam to encode data into the data stream. However, the 3 dB modulation bandwidth of conventional electro-optic modulators are in the range of a gigahertz (GHz) to a few tens of GHz (~30 GHz), which is significantly less than the approximately 120 GHz bandwidth required by next generation optics-based telecommunications systems and next generation optical links.

BRIEF SUMMARY

Various embodiments provide modulators (e.g., MZMs, EAMs, and/or the like) having high bandwidth. Various embodiments provide modulators having 3 dB modulation bandwidth of at least 100 GHz. Various embodiments provide methods for fabricating modulators having 3 dB modulation bandwidth of at least 100 GHz. In various embodiments, the modulator has a serial neutral volume resistance (SNVR) of no more than 4 Ohms. In various embodiments, the modulator has a loaded line impedance (LLI) that is within 2 Ohms of the common line impedance.

In an example embodiment, the modulator includes an interface layer disposed between the loading electrodes and the optical waveguide structure. In an example embodiment, the interface layer is a doped layer. In an example embodiment, an annealing process is used to decrease the resistance between the loading electrodes and the interface layer. In an example embodiment, the thickness and/or doping of the near core cladding layer is configured to control the absorption properties of the waveguide and to constrain the SNVR of the modulator.

According to aspects of the present disclosure, a high bandwidth optical modulator is provided. In an example embodiment, the optical modulator comprises one or more transmission lines configured to provide a respective radio frequency signal to a respective plurality of segmented capacitive loading electrodes; one or more pluralities of segmented capacitive loading electrodes in electrical communication with a respective one of the one or more transmission lines and in electrical communication with an interface layer of a semiconductor waveguide structure; and the semiconductor waveguide structure formed on a substrate. The semiconductor waveguide structure is configured to modulate an optical signal propagating through at least a portion of the semiconductor waveguide structure based at least in part on the respective radio frequency signal, and comprising the interface layer. The interface layer (a) comprises at least one semiconductor material and (b) is configured such that an interface resistance is less than or equal to 4 Ohms. The interface resistance is a serial resistance between the interface layer and respective electrodes of the one or more pluralities of segmented capacitive loading electrodes.

According to another aspect, a method for fabricating a high bandwidth optical modulator is provided. In an example embodiment, the method comprises; forming a semiconductor waveguide structure on a substrate; forming an interface layer on the semiconductor waveguide structure; and depositing one or more pluralities of segmented capacitive loading electrodes and one or more transmission lines onto respective portions of the substrate and interface layer. The one or more pluralities of segmented capacitive loading electrodes are each in electrical communication with a respective one of the one or more transmission lines and in electrical communication with the interface layer of a semiconductor waveguide structure. The interface layer (a) comprises at least one semiconductor material and (b) is configured such that an interface resistance is less than or equal to 4 Ohms. The interface resistance is a serial resistance between the interface layer and respective electrodes of the one or more pluralities of segmented capacitive loading electrodes.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "top," "about," "around," etc. are used for explanatory purposes in the examples provided below to describe the relative position of certain components or portions of components. As used herein, the terms "substantially" and "approximately" refer to tolerances within appropriate manufacturing and/or engineering standards.

Various embodiments provide high bandwidth (e.g., >100 GHz) electro-optical modulators and/or other electro-optical components. In various embodiments, the high bandwidth electro-optical modulators and/or other electro-optical components comprise an interface layer disposed between loading electrodes and a semiconductor waveguide structure of the electro-optical modulators and/or other electro-optical components. The interface between the loading electrodes and the interface layer defines and/or is characterized by an interface resistance. In various embodiments, the interface resistance is less than 4 Ohms.

In various embodiments, the waveguide structure defines a waveguide structure resistance that is the serial resistance of one or more non-depleted semiconductor layers between a bottom electrode of the modulator and/or other component and the interface layer and/or the loading electrodes. In various embodiments, the waveguide structure resistance is less than 4 Ohms. In an example embodiment, the sum of the interface resistance and the waveguide structure resistance is no more than 4 Ohms.

In various embodiments, the electro-optical modulator and/or other electro-optical component comprises and/or is coupled to (e.g., in electronic communication with) one or more transmission lines (e.g., via one or more respective loading electrodes). The one or more transmission lines, the respective loading electrodes, and/or the semiconductor waveguide structure define an effective loaded line impedance. In various embodiments, the semiconductor waveguide structure is configured such that the effective loaded line impedance is within 2 Ohms of the radio and/or microwave frequency system impedance (e.g., the impedance of a radio and/or microwave frequency system configured to drive the modulator and/or other component by generating a radio and/or microwave frequency signal that is applied to the one or more transmission lines) and the load impedance.

Figure 1A:
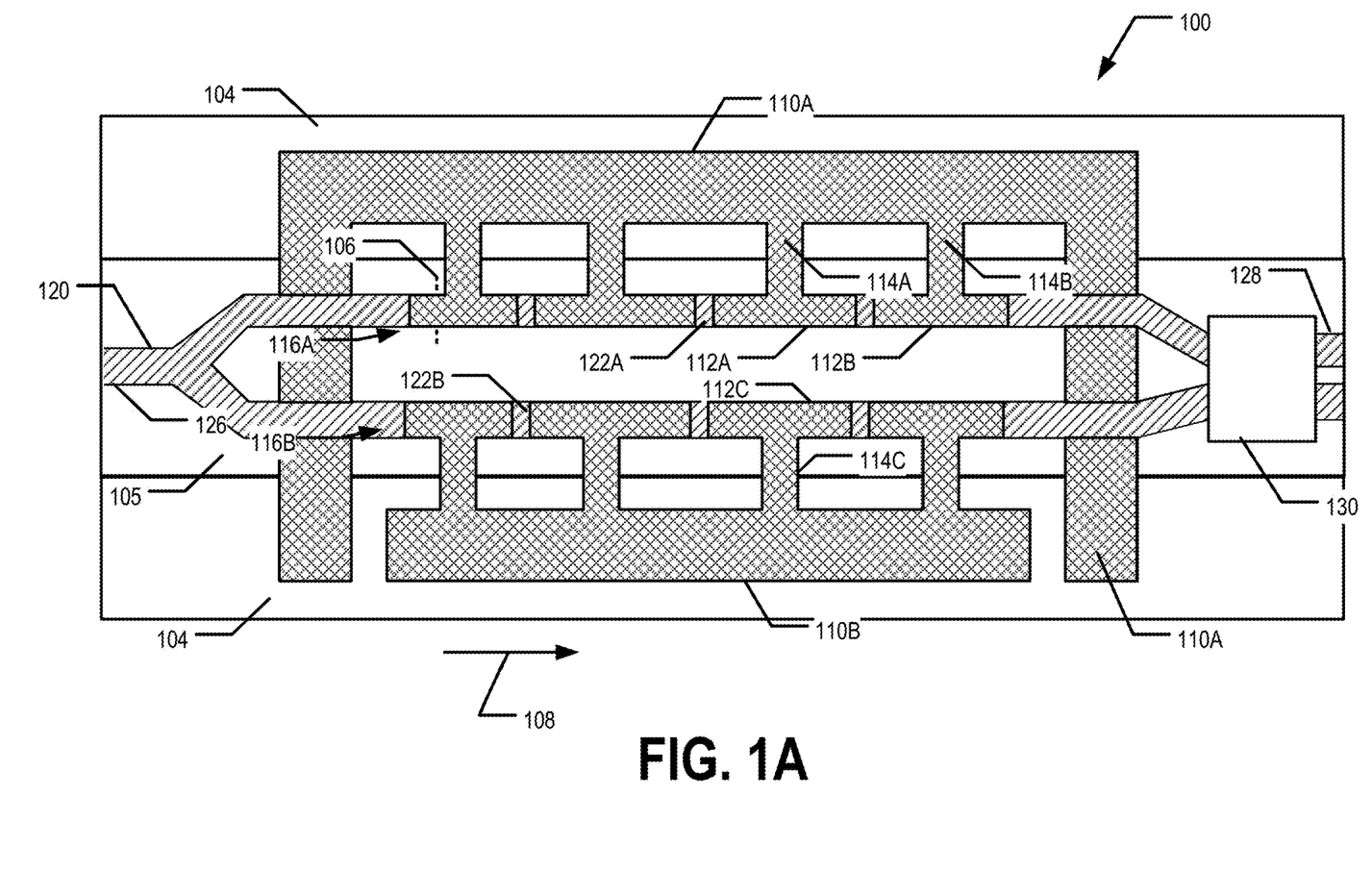
FIG. 1A is a top view of an example modulator, according to an example embodiment.

FIG. 1A illustrates a top view of an example high bandwidth MZM modulator 100 of an example embodiment. The modulator 100 comprises a semiconductor waveguide structure 120 formed at least in part on a substrate 105. For example, in an example embodiment, the modulator 100 is formed on a chip (e.g., on and/or comprising the substrate 105) so as to provide a modulator chip.

In various embodiments, the semiconductor waveguide structure 120 extends an arm length from an input end 126 to an output end 128. For at least a portion of the arm length, the semiconductor waveguide structure 120 is split (e.g., via a beam splitter and/or the like) into a first waveguide arm 122A and a second waveguide arm 122B. In an example embodiment, the first waveguide arm 122A and the second waveguide arm 122B are substantially parallel to one another. A beam coupler 130 interacts a first beam propagating along the first waveguide arm 122A and a second beam propagating along the second waveguide arm 122B such that the output end 128 of the semiconductor waveguide structure 120 provides a result of interacting the first beam and the second beam. Thus the effective path length difference between the first waveguide arm 122A and the second waveguide arm 122B (caused by the application of different electric signals and/or electric fields to the respective waveguide arms 122A, 122B) causes a corresponding interference pattern in the resulting beam(s) provided via the output end 128 of the semiconductor waveguide structure 120.

In various embodiments, the modulator comprises a first transmission line 110A and a second transmission line 110B. The first transmission line 110A is in electrical communication with a first plurality of loading electrodes 116A and the second transmission line 110B is in electrical communication with a second plurality of loading electrodes 116B. In various embodiments, each of the plurality of loading electrodes 116A, 116B comprises two or more electrodes 112 (e.g., 112A, 112B, 112C). Each electrode 112 is coupled to the respective transmission line 110A, 110B via a respective electrode bridge 114 (e.g., 114A, 114B, 114C). For example, as depicted, the electrode 112A is in electrical communication with the first transmission line 110A via the bridge 114A.

In various embodiments, the transmission lines 110A, 110B are formed on an insulating material 104. In an example embodiment, the insulating material 104 is an insulating layer formed on and/or at least partially embedded into the substrate 105 to electrically insulate the substrate 105 from the transmission lines 110A, 110B. In an example embodiment, the insulating material 104 forms an insulated substrate that is separate from (but adjacent to) the substrate 105.

In various embodiments, the electrodes 112 are segmented capacitive loading electrodes such that each of the plurality of loading electrodes 116 comprises a respective plurality of segmented capacitive loading electrodes that are each in electrical communication with a respective one of the transmission lines 110A, 110B. In various embodiments, each of the electrodes 112 is in electrical communication with an interface layer of the semiconductor waveguide structure 120. Thus, the modulator 100 is configured such that a respective radio and/or microwave frequency signal applied to a respective transmission line 110 is provided to a respective plurality of loading electrodes, which transfer the electrical signal to an interface layer of the respective waveguide arm 122 of the semiconductor waveguide structure 120 such that the optical beam propagating along the respective waveguide arm 122 is modulated based at least in part on the respective radio and/or microwave frequency signal.

In various embodiments, each of the plurality of loading electrodes 116 are periodic. For example, in an example embodiment, each electrode 112 of a respective plurality of loading electrodes is a same length in the direction of propagation 108, a same width in a direction transverse to the direction of propagation 108, and/or separated from the adjacent electrode(s) 112 of the respective plurality of loading electrodes 116 by a set distance. In an example embodiment, a plurality of loading electrodes 116 forms a capacitive loading electrode train on the respective waveguide arm 122. In an example embodiment, the plurality of loading electrodes 116 are configured to reduce the propagation velocity of a radio and/or microwave signal propagating through the respective transmission line 110 such that the propagation of velocity of the radio and/or microwave signal through the respective transmission line is substantially equal to and/or matched to the velocity of light propagating through the respective waveguide arm 122. In various embodiments, the electrodes 112 and the respective bridges are formed of metal (e.g., gold, copper, and/or the like) and/or another electrically conductive material.

In various embodiments, each transmission line 110 is coupled to (e.g., in electrical communication with) an output of a radio and/or microwave frequency system. In various embodiments, the radio and/or microwave frequency system is part of and/or controlled by a controller for the optical link and/or other structure, arrangement, and/or system comprising the modulator 100. For example, the radio and/or microwave frequency system may be a signal generator (e.g., a digital/analog convertor (DAC), arbitrary waveform generator (AWG), local oscillator, and/or the like) configured to generate and/or provide a radio and/or microwave frequency electric signal. In various embodiments, each of the transmission lines 110 is configured to efficiently provide a radio and/or microwave frequency signal to the respective plurality of electrodes 116. For example, the transmission lines 110 are configured to have low resistance so as to reduce the heat generated as a radio and/or microwave frequency signals propagate through the transmission lines 110 and/or to maintain the integrity of (e.g., limit the noise introduced into) the radio and/or microwave frequency signal as the radio and/or microwave frequency signals propagate through the transmission lines. For example, the transmission lines 110 may be made of metal (e.g., gold, copper, and/or the like) and/or another electrically conductive material.

In various embodiments, the radio and/or microwave frequency system, the transmission lines 110, and the pluralities of loading electrodes together define a radio and/or microwave frequency system impedance and load impedance, also referred to as the common line impedance. In various embodiments, the radio and/or microwave frequency system impedance and load impedance or common line impedance is substantially equal to 50 Ohms; however, smaller or larger values are possible in various systems and/or arrangements.

Figure 1B:
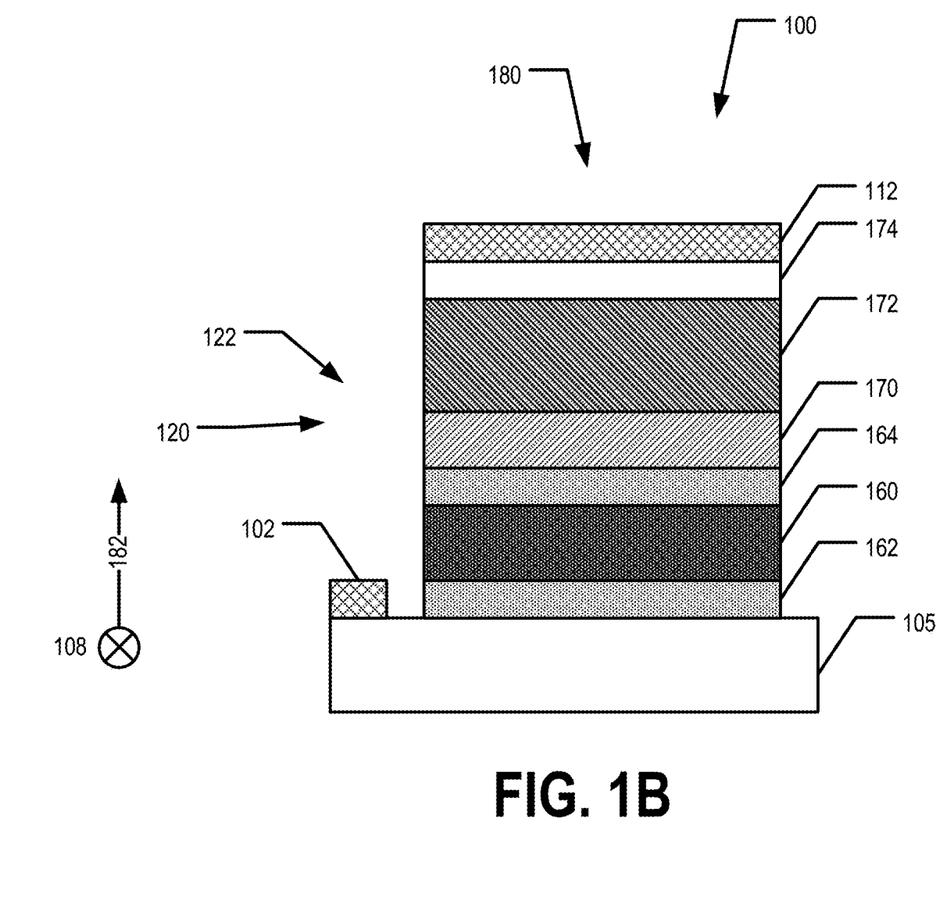
FIG. 1B is a partial cross-sectional view of the example modulator shown in FIG. 1A, according to an example embodiment.

FIG. 1B illustrates a cross-section of the modulator 100 taken at line 106. For example, the cross-section of the modulator 100 shown in FIG. 1B shows a cross-section of the first waveguide arm 122A at a location where a loading electrode 112 is present in a plane that is perpendicular and/or substantially transverse to the direction of propagation 108. As should be understood, the cross-section of the first waveguide arm 122A at a location between loading electrodes 112 would be similar to that shown in FIG. 1B, but without the loading electrode 112 disposed on the surface of the waveguide mesa 180 that is opposite the substrate 105. In various embodiments, the cross-section of second waveguide arm 122B is substantially the same as the cross-section of the first waveguide arm 122A.

In various embodiments, the semiconductor waveguide structure 120 includes a waveguide mesa 180 formed on a substrate 105. In an example embodiment, the substrate 105 is an InP substrate. In an example embodiment, the substrate is doped with an n-type dopant. For example, in an example embodiment, the substrate is an N-InP substrate that is doped with a dopant density in a range of $1\times10^{18}$ cm$^{-3}$ to $7\times10^{18}$ cm$^{-3}$ (e.g., substantially equal to $4\times10^{18}$ cm$^{-3}$). In an example embodiment, the substrate is approximately 2 to 6 μm (e.g., 4 μm) thick in the mesa height direction 182. In an example embodiment, the mesa height direction 182 is substantially perpendicular to the interfaces between the various layers of the semiconductor waveguide structure 120.

In various embodiments, the semiconductor waveguide structure comprises an optical waveguide core 160 disposed between a first optical waveguide peripheral layer 162 and a second optical waveguide peripheral layer 164. For example, in the illustrated embodiment, the first optical waveguide peripheral layer 162 is formed on the substrate 105 (possibly with a buffer layer therebetween in various embodiments). The optical waveguide core 160 is formed on the first optical waveguide peripheral layer 162 and the second optical waveguide peripheral layer 164 is formed on the optical waveguide core 160. In various embodiments, the optical waveguide core 160 is configured to transmit and/or propagate an optical beam and/or signal therethrough. In various embodiments, the first and second optical waveguide peripheral layers 162, 164 are configured to confine the optical beam and/or signal within the optical waveguide core 160 and prevent leakage and/or absorption of an optical beam and/or signal propagating through the optical waveguide core 160 out of the optical waveguide core.

In various embodiments, the optical waveguide core 160 and the first and second optical waveguide optical peripheral layers 162, 164 comprise one or more semiconductor materials. In an example embodiment, the first and second waveguide optical peripheral layers 162, 164 are substantially similar other than their placement with respect to the optical waveguide core 160 and the substrate 105. In an example embodiment, the first and second waveguide optical peripheral layers 162, 164 comprise different semiconductor materials, are doped differently, and/or have different thicknesses in the mesa height direction 182.

In an example embodiment, the first and/or second waveguide optical peripheral layers 162, 164 are in a range of 0.05 to 0.101 μm thick in the mesa height direction 182. In an example embodiment, the first and/or second waveguide optical peripheral layers 162, 164 are formed of and/or comprise undoped InP. In an example embodiment, the first and/or second waveguide optical peripheral layers 162, 164 are formed of and/or comprised of a lattice matched InGaAlAsP composition that has a larger energy gap than the material of the optical waveguide core 160. In an example embodiment, the first and/or second optical waveguide peripheral layers 162, 164 are doped with n and/or p-type dopant to a dopant density in the range of $5\times10^{14}$ cm$^{-3}$ to $5\times10^{15}$ cm$^{-3}$. For example, in various embodiments, both the first and/or second waveguide optical peripheral layers 162, 164 and the optical waveguide core 160 have low carrier concentrations (e.g., compared to the near core cladding layer 170 and/or distal cladding layer 172).

In various embodiments, the optical waveguide core 160 comprises a plurality of quantum wells. In some examples, the optical waveguide core 160 comprises multi-quantum well and/or dots layers. For example, the multi-quantum well and/or dots layers may comprise a stack or a series of quantum wells disposed between a series of (quantum) barriers. In various embodiments, the multi-quantum well and/or dots layers are configured to propagate light and/or an optical beam or signal in the propagation direction 108. In various embodiments, the multi-quantum well and/or dots layers are formed from GaAs or InP-based semiconductor materials. For example, in various embodiments, the optical waveguide core 160 comprises GaAs and/or InP-based semiconductor materials. In an example embodiment, the waveguide core 160 (and/or the first and/or second optical waveguide peripheral layers 162, 164, near core cladding layer 170, and/or distal cladding layer 172) comprises SiGe and/or and SiGe composition and the substrate 105 is a silicon substrate. In various embodiments, the optical waveguide core 160 comprises fifteen or more multi-quantum well and/or dots layers; however, embodiments including one to fifteen multi-quantum well and/or dots layers are also envisioned. In various embodiments, the optical waveguide core 160 comprises an n and/or p-type dopant density of in the range of $5\times10^{14}$ cm$^{-3}$ to $5\times10^{15}$ cm$^{-3}$.

A near core cladding layer 170 is formed on the second optical waveguide peripheral layer 164. In an example embodiment, the near core cladding layer 170 is formed of and/or comprises p-type doped InP and/or n-type doped semiconductor material. In various embodiments, the near core cladding layer 170 has a thickness of 0.1 to 0.2 μm in the mesa height direction 182 and/or a p-type dopant density of at least $1\times10^{17}$ cm$^{-3}$ (e.g., greater than or equal to $2\times10^{17}$ cm$^{-3}$ and/or up to $1\times10^{20}$ cm$^{-3}$). In various embodiments, the near core cladding layer 170 and/or the distal cladding layer 172 are configured to reduce the absorption of an optical beam and/or signal propagating through the semiconductor waveguide structure 120 to prevent its absorption by the interface layer 174, electrodes 112, and/or the like.

In an example embodiment, a distal cladding layer 172 is formed on the near core cladding layer 170. In various embodiments, the distal cladding layer 172 is formed of and/or comprises p-type doped InP and/or n-type doped semiconductor material. In various embodiments, the distal cladding layer 172 is doped with the same type of dopant as the near core cladding layer 170. In various embodiments, the distal cladding layer 172 has a thickness of 1.5 to 2 μm in the mesa height direction 182 and/or a dopant density (p-type or n-type as appropriate for the application) of $1\times10^{18}$ cm$^{-3}$ to $1\times10^{19}$ cm$^{-3}$. In various embodiments, the distal cladding layer 172 is configured to reduce the absorption of an optical beam and/or signal propagating through the semiconductor waveguide structure 120 that is absorbed by the interface layer 174, electrodes 112, and/or the like.

In various embodiments, the semiconductor waveguide structure 120 further comprises an interface layer 174 formed on the distal cladding layer 172. In various embodiments, the interface layer 174 is configured to reduce the resistance between the electrode 112 and the semiconductor waveguide structure 120. In various embodiments, the interface layer 174 comprises and/or is formed of a semiconductor material. For example, in an example embodiment, the interface layer 174 comprises InGaAs. In an example embodiment, the interface layer 174 comprises p-type doped InGaAs with a dopant density in the range of $1\times10^{18}$ cm$^{-3}$ to $1\times10^{19}$ cm$^{-3}$. In an example embodiment, the interface layer 174 has a thickness of 0.05 to 0.2 μm (e.g., 0.1 μm) in the mesa height direction 182. In various embodiments, the semiconductor material of the interface layer 174 is selected and/or a dopant type and/or dopant density is selected to reduce the resistance between the electrode 112 and the semiconductor layers of the semiconductor waveguide structure 120.

In an example embodiment, the electrode 112 is deposited onto the interface layer 174. FIG. 1B additionally includes a ground contact 102 not shown in FIG. 1A for the sake of clarity of the drawing. The ground contact 102 is configured to be placed into electrical communication with ground so as to ground the substrate 105 and/or the semiconductor waveguide structure 120. In various embodiments, the ground contact 102 is deposited on the substrate 105 and/or in electrical communication therewith. In various embodiments, the ground contact 102 is made of metal (e.g., gold, copper, and/or the like) and/or other conductive material.

The serial resistance between the electrode 112 and the semiconductor waveguide structure 120 (e.g., between the electrode 112 and the interface layer 174 of the semiconductor waveguide structure 120) is referred to herein as the interface resistance. The serial resistance of one or more non-depleted semiconductor layers between the ground electrode 102 and/or the substrate 105 of the modulator 100 and a respective electrode 112 is referred to herein as the waveguide structure resistance. In other words, the waveguide structure resistance is the serial resistance of all of the layers of the semiconductor waveguide structure 120 that are out of the depletion region electric field (e.g., the substrate 105, the near core cladding layer 170, the distal cladding layer 172, and/or the like).

In various embodiments, the interface resistance is less than 4 Ohms. In various embodiments, the waveguide structure resistance is less than 4 Ohms. In various embodiments, the SNVR, which is the sum of the interface resistance and the waveguide structure resistance, is no more than 4 Ohms. In an example embodiment, the SNVR is no more than 2 Ohms.

In conventional modulators, such as traveling wave electrode MZM modulators, the SNVR tends to be in the 8 to 15 Ohm range. In various embodiments, the interface layer 174 is added to the semiconductor waveguide structure 120 to act as an interface between the electrodes 112 and the cladding layers 172, 170. In various embodiments, the interface layer 174 comprises a semiconductor material selected so as to reduce the interface resistance and/or the resistance between the interface layer 174 and the distal cladding layer 172 (e.g., which may contribute the waveguide structure resistance). In various embodiments, the interface layer 174 is thin (e.g., has a thickness of 0.05 to 0.2 μm (e.g., 0.1 μm) in the mesa height direction 182). In various embodiments, the interface layer 174 comprises a low bandgap semiconductor. For example, in an example embodiment, the interface layer 174 comprises InGaAs. In various embodiments, the thickness of the distal cladding layer 172 and/or near core cladding layer 170 is configured to prevent and/or reduce optical absorption by the interface layer 174.

In various embodiments, the interface layer 174 is doped so as to reduce the interface resistance and/or the resistance between the interface layer 174 and the distal cladding layer 172 (e.g., which may contribute the waveguide structure resistance). For example, the interface layer 174 may be a heavily doped layer. In an example embodiment, the dopant density of the interface layer 174 is in the range of $1\times10^{18}$ cm$^{-3}$ to $1\times10^{19}$ cm$^{-3}$. For example, in an example embodiment, the interface layer 174 is heavily p-type doped InGaAs (e.g., with a p-type dopant density of approximately $5\times10^{18}$ cm$^{-3}$).

In various embodiments, the interface between the respective electrodes 112 and the interface layer 174 is activated after the deposition of the electrodes 112 onto the interface layer 174. For example, after the electrodes 112 are deposited onto the interface layer, an annealing step may be used to reduce the resistivity of the interface between the respective electrodes 112 and the interface layer 174 by causing some of the material of the electrodes 112 to become intermixed with some of the material of the interface layer 174 at the interface between the respective electrodes 112 and the interface layer 174.

Figure 2A:
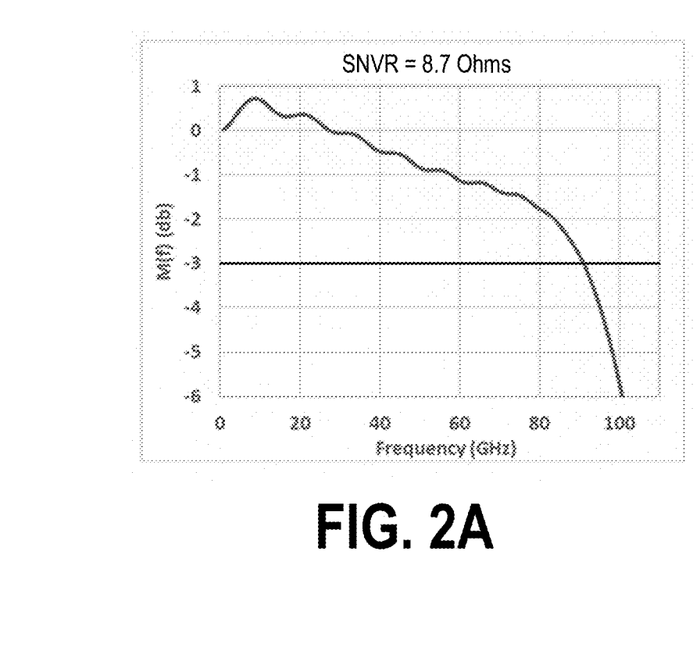
FIG. 2A provides a plot illustrating the modulation frequency response of a conventional modulator and FIG. 2B provides a plot illustrating the modulation frequency response of a modulator in accordance with an example embodiment.
Figure 2B:
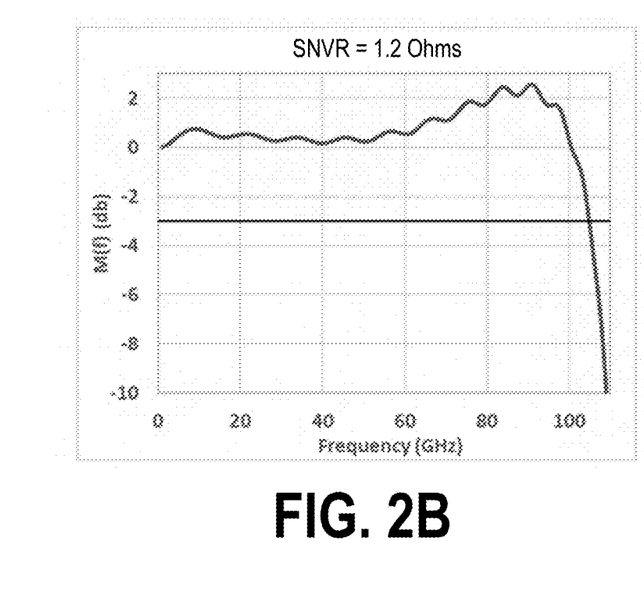

FIG. 2A illustrates the modulation frequency response of a modulator having an SNVR of 8.7 Ohms, and FIG. 2B illustrates the modulation frequency response of modulator 100 of an example embodiment having an SNVR of 1.2 Ohms. These modulators for which results are shown in FIGS. 2A and 2B are similar other than their respective SNVRs. As can be seen in FIG. 2A, the modulator with the SNVR of 8.7 Ohms has a 3 dB modulation bandwidth of approximately 90 GHz. The modulator 100 with the SNVR of 1.2 Ohms, however, has a significantly higher 3 dB modulation bandwidth (e.g., approximately 110 GHz, for this example embodiment), as shown in FIG. 2B.

In various embodiments, the loaded line impedance of the modulator 100 is configured to match (e.g., be no more than 2 Ohms above or below) the radio frequency system impedance and load impedance. In various embodiments, the load line impedance $Z_L$ of the modulator 100 is a function of the inductance $L_m$ of the unloaded transmission lines 110, the target capacitive load impedance $C_L$ required for matching the velocity of the electric signal in the electrodes 112 to the velocity of the optical beam and/or signal propagating through the semiconductor waveguide structure 120, and the unloaded line capacitance $C_\mu$ of the transmission lines 110. For example, $L_m = n_0 Z_0/c$, where $n_0$ is the effective optical refractive index of the waveguide structure (taking into account the refractive index of the underlying substrate 105), $Z_0$ is the common line impedance (usually about 50 Ohms), and c is the speed of light in a vacuum. The target capacitive load impedance $C_L = (n_0^2 - n_\mu^2)/(cZ_0 n_0)$, where $n_\mu$ is the unloaded transmission line radio frequency index. The unloaded line capacitance $C_\mu = L_\mu / Z_\mu^2$, where $Z_\mu$ is the unloaded line impedance. The loaded line impedance $Z_L = (L_m/(C_L+C_\mu))^{1/2}$. In various embodiments, the effective optical refractive index no and the unloaded transmission line radio frequency index $n_\mu$ for a semiconductor waveguide structure 120 is determined based on empirical data, simulated data for the semiconductor waveguide structure, and/or computed based on known material properties of the components of the semiconductor waveguide structure.

In various embodiments, the radio and/or microwave frequency system impedance (e.g., the impedance of a radio and/or microwave frequency system configured to drive the modulator and/or other component by generating a radio and/or microwave frequency signal that is applied to the one or more transmission lines) and the load impedance for the modulator 100 and/or that are to be employed in an optical link or other system and/or arrangement with the modulator 100 are known, determined, and/or estimated. The semiconductor waveguide structure 120 is then designed and/or configured to have a loaded line impedance $Z_L$ that is within 2 Ohms of the radio and/or microwave frequency system impedance and the load impedance expected to be experienced by the modulator 100 when deployed in an optical link and/or other system and/or arrangement. For example, for a radio and/or microwave frequency system impedance and load impedance $Z_S$, the semiconductor waveguide structure 120 is configured such that $Z_S$-2 Ohms $\leq Z_L \leq Z_S$+2 Ohms. For example, the materials and dopant densities used in the various layers of the semiconductor waveguide structure 120; the geometry of the transmission lines, bridges, and electrodes 112; and/or the like are configured and/or designed to cause the loaded line impedance $Z_L$ to substantially match (e.g., be within 2 Ohms of) the radio and/or microwave frequency system impedance and load impedance $Z_S$.

Figure 3A:
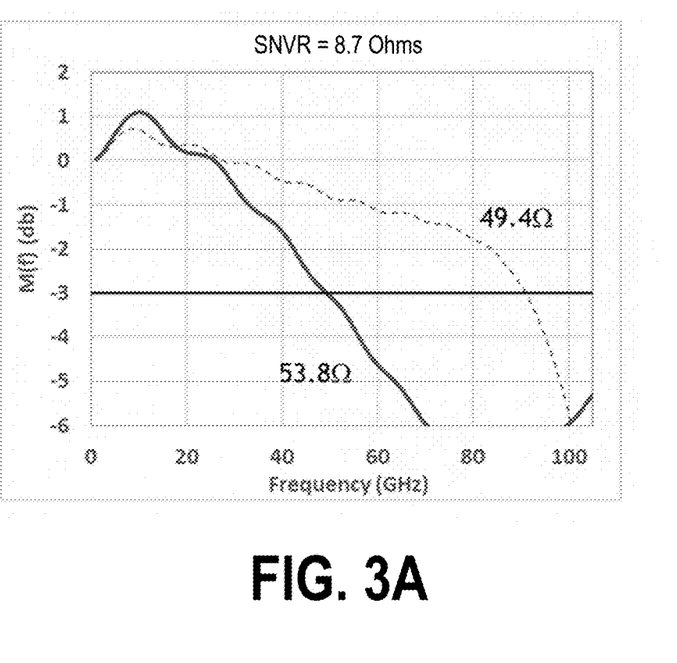
FIGS. 3A and 3B provide respective plots illustrating the modulation frequency response of modulators with different SNVRs for two different LLIs.
Figure 3B:
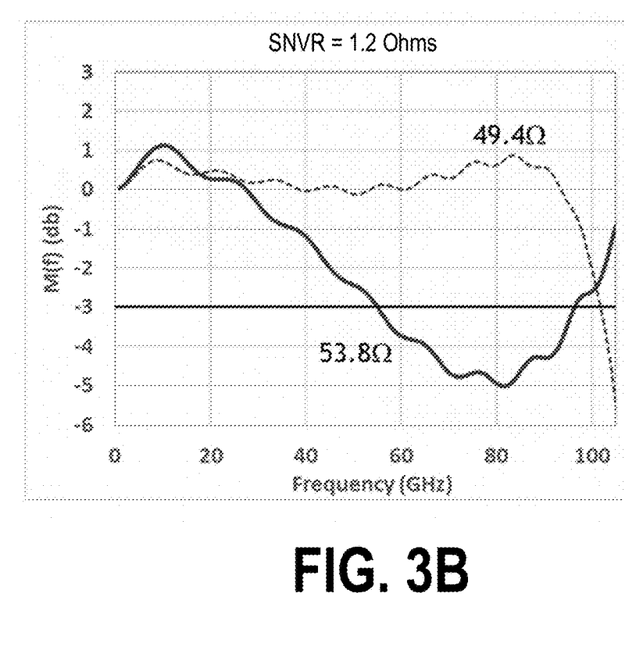

FIG. 3A illustrates the modulation frequency response of two modulators that each have an SNVR of 8.7 Ohms, and FIG. 3B illustrates the modulation frequency response of two modulators 100 of example embodiments that each have an SNVR of 1.2 Ohms. In FIGS. 3A and 3B, the radio and/or microwave frequency system impedance and load impedance $Z_S$ is 50 Ohms. FIG. 3A illustrates the modulation frequency response of a modulator having an SNVR of 8.7 Ohms and a loaded line impedance $Z_L$=49.4 Ohms as a dashed line and further illustrates a modulator having an SNVR of 8.7 Ohms and a loaded line impedance $Z_L$=53.8 Ohms as a solid line. As can be seen by comparing the solid and dashed lines in FIG. 3A, the modulator that has a loaded line impedance that does not substantially match the radio and/or microwave frequency system impedance and load impedance $Z_S$=50 Ohms (solid line) has a significantly lower 3 dB modulation bandwidth (approximately 50 GHz) compared to the modulator that has a loaded line impedance that does substantially match the radio and/or microwave frequency system impedance and load impedance $Z_S$=50 Ohms (dashed line). FIG. 3B illustrates the modulation frequency response of a modulator having an SNVR of 1.2 Ohms and a loaded line impedance $Z_L$=49.4 Ohms as a dashed line and further illustrates a modulator having an SNVR of 1.2 Ohms and a loaded line impedance $Z_L$=53.8 Ohms as a solid line. As can be seen by comparing the solid and dashed lines in FIG. 3B, the modulator that has a loaded line impedance that does not substantially match the radio and/or microwave frequency system impedance and load impedance $Z_S$=50 Ohms (solid line) has a significantly lower 3 dB modulation bandwidth (approximately 55 GHz) compared to the modulator that has a loaded line impedance that does substantially match the radio and/or microwave frequency system impedance and load impedance $Z_S$=50 Ohms (dashed line).

Thus, as shown in FIGS. 2A, 2B, 3A, and 3B, while one of ordinary skill in the art would not expect such dramatic changes in the modulation bandwidth of a modulator based on such changes, reducing the SNVR of the modulator 100 to under 4 Ohms and matching (e.g., within 2 Ohms of) the loaded line impedance $Z_L$ to the radio and/or microwave frequency system impedance and load impedance $Z_S$ substantially increases the 3 dB modulation bandwidth of the modulators. Indeed, various embodiments provide a technical improvement to the field of modulators.

Figure 4:
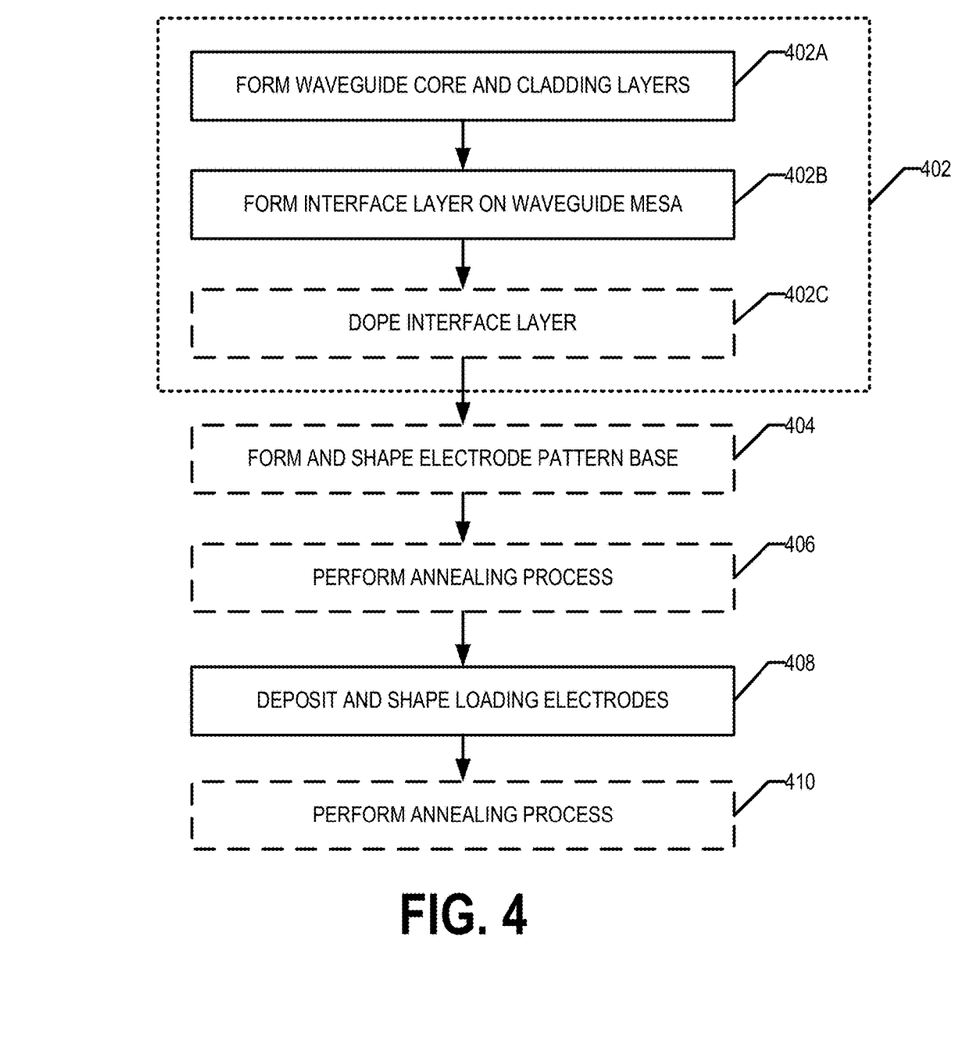
FIG. 4 is a flowchart illustrating various processes, procedures, and/or operations for fabricating a modulator, according to an example embodiment.

FIG. 4 provides a flowchart illustrating processes, procedures, operations, and/or the like for fabricating a modulator 100, in accordance with an example embodiment. Starting at step/operation 402, one or more waveguide mesas 180 (e.g., two arms of a semiconductor waveguide) are formed on a substrate 105. In an example embodiment, the optical waveguide core 160, first and second waveguide peripheral layers 162, 164, near core cladding layer 170, and distal cladding layer 172 are formed on the substrate 105 at step/operation 402A. For example, a first optical waveguide peripheral layer 162 may be formed on the substrate 105. An optical waveguide core layer 160 may then be formed on the first optical waveguide peripheral layer 162. A second optical waveguide peripheral layer 164 is then formed on the optical waveguide core layer 160. A near core cladding layer 170 is then formed on the second optical waveguide peripheral layer 164, and a distal cladding layer 172 is formed on the near core cladding layer 170. In an example embodiment, the formed layers may then be etched to form the waveguide arms 122A, 122B. In an example embodiment, the semiconductor waveguide structure 120 is etched to form the waveguide arms 122A, 122B after the formation of the interface layer 174 and/or after deposition of the electrodes and/or contacts.

At step/operation 402B, the interface layer 174 is formed on the waveguide mesa 180. For example, the interface layer 174 is grown, deposited, and/or otherwise formed on the distal cladding layer 172. In an example embodiment, the interface layer 174 is formed to have a thickness of 0.05 to 0.2 μm (e.g., 0.1 μm) in the mesa height direction 182. The interface layer 174 is doped at step/operation 402C. For example, the interface layer may be doped with a selected dopant until the interface layer reaches a dopant density of the selected dopant within the range of $1 \times 10^{18}$ cm$^{-3}$ to $1 \times 10^{19}$ cm$^{-3}$. In various embodiments, steps/operations 402A, 402B, and/or 402C are performed as a single growth process (e.g., as sub-steps/operations), rather than as distinct steps/operations.

At step/operation 404, an electrode pattern base is formed and shaped. For example, a thin metallic and/or conductive contact layer may be deposited and/or formed on the interface layer 174. The thin metallic and/or conductive contact layer may then be shaped by etching and/or a lift off process such that the thin metallic and/or conductive contact layer only the areas on the surface of the mesa(s) 180 where the loading electrodes 112 will be located. At step/operation 406, an annealing process is performed to activate the interface between the thin metallic and/or conductive contact layer and the interface layer 174. In an example embodiment, the annealing process comprises heating the semiconductor waveguide structure(s) 120 formed on the substrate 105 to an annealing temperature for an annealing time. In various embodiments, the annealing temperature and annealing time are dependent on the semiconductor material of the interface layer 174. In an example embodiment, the annealing temperature is in the range of 350 to 400° C. and the annealing time is in the range of 1 to 5 minutes. Higher or lower annealing temperatures and/or shorter or longer annealing times may be used, in various embodiments, as appropriate for the semiconductor material of the interface layer 174 and/or the conductive material of the thin metallic and/or conductive contact layer.

At step/operation 408, the loading electrodes 112 are deposited. For example, conductive material to be shaped into the loading electrodes 112 may be deposited onto the interface layer 174. In an example embodiment, the ground contact 102, transmission lines 110, and/or bridges 114 are also deposited. The loading electrodes 112 are then shaped. For example, an (masked) etching process may be used to etch conductive material deposited onto the interface layer 174 into respective pluralities of loading electrodes 116. For example, the conductive material deposited onto the interface layer 174 may be shaped to form periodic loading electrode 112 trains. In an example embodiment, the loading electrodes 112 are formed on the portions of the surface(s) of the mesa(s) 180 where the thin metallic and/or conductive contact layer is disposed. In various embodiments, the ground contact 102, transmission lines 110, and/or bridges 114 may also be shaped, possibly using a masked etching process.

At step/operation 410, an annealing process is performed to activate the interface between the respective electrodes 112 and the interface layer 174 and/or to activate the interface between the ground contact 102 and the substrate 105. In an example embodiment, the annealing process comprises heating the semiconductor waveguide structure(s) 120 formed on the substrate 105 to an annealing temperature for an annealing time. In various embodiments, the annealing temperature and annealing time are dependent on the semiconductor material of the interface layer 174 and/or the semiconductor material of the substrate 105. In an example embodiment, the annealing temperature is in the range of 350 to 400° C. and the annealing time is in the range of 1 to 5 minutes. Higher or lower annealing temperatures and/or shorter or longer annealing times may be used, in various embodiments, as appropriate for the semiconductor material of the interface layer 174, semiconductor material of the substrate 105, and/or the conductive material of the electrodes 112 and/or ground contact 102.

In various embodiments, the modulator may then be incorporated into an optical link, system, and/or arrangement wherein one or more radio and/or microwave frequency systems having respective radio and/or microwave frequency system impedances and load impedances $Z_S$ that are each a substantial match for the loaded line impedance $Z_L$ of the modulator drive the modulator via the respective transmission lines 110.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An optical modulator, comprising:
   a semiconductor waveguide structure formed on a substrate and comprising an interface layer;
   one or more pluralities of segmented capacitive loading electrodes formed on the semiconductor waveguide structure; and
   one or more transmission lines, each of the one or more transmission lines (a) in electrical communication with a respective plurality of segmented capacitive loading electrodes of the one or more pluralities of segmented capacitive loading electrodes and (b) configured to provide a respective radio frequency signal to the respective plurality of segmented capacitive loading electrodes,
   wherein the one or more pluralities of segmented capacitive loading electrodes are in electrical communication with the interface layer of the semiconductor waveguide structure,
   wherein the semiconductor waveguide structure is configured to modulate an optical signal propagating through at least a portion of the semiconductor waveguide structure based at least in part on the respective radio frequency signal, and
   wherein the interface layer (a) comprises at least one semiconductor material and (b) is configured to provide an interface resistance less than or equal to 4 Ohms, wherein the interface resistance is a serial resistance between the interface layer and respective electrodes of the one or more pluralities of segmented capacitive loading electrodes.

2. The optical modulator of claim 1, wherein the semiconductor waveguide structure resistance is less than or equal to 4 Ohms, wherein the semiconductor waveguide structure resistance is a serial resistance of one or more non-depleted semiconductor layers between a bottom electrode of the optical modulator and a respective one of the one or more pluralities of segmented capacitive loading electrodes.

3. The optical modulator of claim 2, wherein a sum of the interface resistance and the semiconductor waveguide structure resistance is less than or equal to 4 Ohms.

4. The optical modulator of claim 2, wherein a sum of the interface resistance and the semiconductor waveguide structure resistance is less than or equal to 2 Ohms.

5. The optical modulator of claim 1, wherein the one or more transmission lines and/or the one or more pluralities of segmented capacitive loading electrodes define an effective loaded line impedance that is within 2 Ohms of a radio frequency system impedance and a load impedance.

6. The optical modulator of claim 1, wherein the serial resistance between the interface layer and the one or more pluralities of segmented capacitive load electrodes is controlled by at least one of (a) a selection of the at least one semiconductor material, (b) a doping of the at least one semiconductor material, or (c) performing an annealing of the interface layer after the one or more pluralities of segmented capacitive load electrodes are deposited thereon.

7. The optical modulator of claim 1, wherein the at least one semiconductor material of the interface layer is doped to a dopant density of at least $10^{17}$ cm$^{-3}$.

8. The optical modulator of claim 1, wherein at least a portion of a near core cladding layer of the semiconductor waveguide structure has a thickness of 0.1 to 0.2 μm and a p-type dopant density of at least $2\times10^{17}$ cm$^{-3}$.

9. The optical modulator of claim 1, wherein the at least one semiconductor material of the interface layer is InGaAs.

10. The optical modulator of claim 1, wherein the at least one semiconductor material of the interface layer is doped with a p-type dopant.

11. A method for fabricating a modulator, the method comprising:
    forming at least a portion of a semiconductor waveguide structure on a substrate;
    forming an interface layer on the semiconductor waveguide structure; and
    depositing one or more pluralities of segmented capacitive loading electrodes and one or more transmission lines onto respective portions of the substrate and the interface layer,
    wherein the one or more pluralities of segmented capacitive loading electrodes are (a) in electrical communication with a respective one of the one or more transmission lines and (b) in electrical communication with the interface layer of the semiconductor waveguide structure, the interface layer (a) comprises at least one semiconductor material and (b) is configured to provide an interface resistance less than or equal to 4 ohms, and the interface resistance is a serial resistance between the interface layer and respective electrodes of the one or more pluralities of segmented capacitive loading electrodes.

12. The method of claim 11, further comprising, after depositing the one or more pluralities of segmented capacitive loading electrodes, performing an annealing of the one or more pluralities of segmented capacitive loading electrodes and the interface layer.

13. The method of claim 11, wherein the semiconductor waveguide structure resistance is less than or equal to 4 Ohms, wherein the semiconductor waveguide structure resistance is a serial resistance of one or more non-depleted semiconductor layers between a bottom electrode of the modulator and a respective one of the one or more pluralities of segmented capacitive loading electrodes.

14. The method of claim 13, wherein a sum of the interface resistance and the semiconductor waveguide structure resistance is less than or equal to 4 Ohms.

15. The method of claim 13, wherein a sum of the interface resistance and the semiconductor waveguide structure resistance is less than or equal to 2 Ohms.

16. The method of claim 11, wherein the one or more transmission lines and/or the one or more pluralities of segmented capacitive loading electrodes define an effective loaded line impedance, that is within 2 Ohms of a radio frequency system impedance and load impedance.

17. The method of claim 11, wherein the serial resistance between the interface layer and the one or more pluralities of segmented capacitive load electrodes is controlled by at least one of (a) a selection of the at least one semiconductor material, (b) a doping of the at least one semiconductor material, or (c) performing an annealing of the interface layer after the one or more pluralities of segmented capacitive load electrodes are deposited thereon.

18. The method of claim 11, wherein the at least one semiconductor material of the interface layer is doped to a dopant density of at least $10^{17}$ cm$^{-3}$.

19. The method of claim 11, wherein at least a portion of a near core cladding layer of the semiconductor waveguide structure has a thickness of 0.1 to 0.2 μm and a p-type dopant density of at least $2\times10^{17}$ cm$^{-3}$.

20. The method of claim 11, wherein at least one of (a) the at least one semiconductor material of the interface layer is InGaAs or (b) the at least one semiconductor material of the interface layer is doped with a p-type dopant.

* * * * *